United States Patent [19]
Oogita

[11] Patent Number: 5,227,615
[45] Date of Patent: Jul. 13, 1993

[54] PORTABLE TERMINAL DEVICE

[75] Inventor: Yoshinori Oogita, Ikoma, Japan

[73] Assignee: Sharp Kabushiki Kaisha, Osaka, Japan

[21] Appl. No.: 737,308

[22] Filed: Jul. 30, 1991

[30] Foreign Application Priority Data

Aug. 9, 1990 [JP] Japan .................................. 2-211350

[51] Int. Cl.$^5$ .............................................. G06K 5/00
[52] U.S. Cl. ..................................... 235/440; 235/441; 364/708; 439/59
[58] Field of Search ............... 235/486, 380, 440, 441; 361/395, 413; 364/708, 709.1; 439/59, 62, 65, 74

[56] References Cited

U.S. PATENT DOCUMENTS

| | | | |
|---|---|---|---|
| 4,683,550 | 7/1987 | Jindrick et al. | 361/413 |
| 4,705,211 | 11/1987 | Honda et al. | 235/380 |
| 4,719,338 | 1/1988 | Avery et al. | 235/486 |
| 4,774,399 | 9/1988 | Fujita et al. | 235/441 |
| 4,872,091 | 10/1989 | Maniwa et al. | 361/395 |
| 5,043,562 | 8/1991 | Hautvast et al. | 235/440 |
| 5,093,862 | 3/1992 | Scartz | 235/380 |

FOREIGN PATENT DOCUMENTS

| | | | |
|---|---|---|---|
| 84582 | 3/1989 | Japan | 439/62 |
| 1-237785 | 9/1989 | Japan | |

OTHER PUBLICATIONS

R. S. Carter et al, High Performance Parallel Planar Package, IBM Technical Disclosure Bulletin vol. 21 No. 3, Aug. 1978 pp. 1137–1138.

*Primary Examiner*—John Shepperd
*Attorney, Agent, or Firm*—Nixon & Vanderhye

[57] ABSTRACT

A portable terminal device includes a printed wiring board having two main sides, a first interface for a first information data exchanging card disposed on one of the two main sides of the printed wiring board, and a second interface for a second information data exchanging card disposed on the other side of the two main sides of the printed wiring board. The first and second cards can be installed on both sides of the printed wiring board in parallel to each other sandwiching the printed wiring board.

4 Claims, 2 Drawing Sheets

PORTABLE TERMINAL DEVICE

BACKGROUND OF THE INVENTION

1. Field of the Invention

The present invention relates to a portable terminal device to which both of an IC (Integrated Circuit) card and a memory card can be inserted and connected.

2. Description of the Related Art

A portable terminal device is constituted from a left unit and a right unit combined together like a notebook which can be opened and closed. In the left unit, for example, a display portion including a liquid crystal display device and a transparent touch key portion are disposed. Another key portion is disposed in the right unit.

A first inlet for the IC card and a second inlet for the memory card are disposed side by side along the surface of the left unit.

When the IC card is inserted to the device through the first inlet, information data are exchanged between the IC card and the portable terminal device. Also, when the memory card is inserted to the terminal device through the second inlet, information data are exchanged between the memory card and the portable terminal device.

However, in accordance with the above-mentioned related art, the IC card and the memory card are disposed side by side on the same plane, which requires a large space for the two cards, thus making the device bulky.

SUMMARY OF THE INVENTION

It is therefore an object of the present invention to provide a small and compact sized portable terminal device to which both of the IC card and the memory card can be inserted and connected.

The above-mentioned object of the present invention can be achieved by a portable terminal device including:

a printed wiring board having two main surfaces;

a first interface for a first information data exchanging card (IC card) disposed on one of the two surfaces of the printed wiring board; and a second interface for a second information data exchanging card (memory card) disposed on the other of the two surfaces of the printed wiring board, so that the first and second cards are disposed in both sides of the printed wiring board in parallel together and sandwiching the board.

An IC card is inserted to the first interface for the IC card disposed on one side of the printed wiring board, while a memory card is inserted to the second interface for the memory card disposed on the other side of the printed wiring board so that the two cards are superposingly disposed in both sides of the printed wiring board in parallel to each other sandwiching the board.

Therefore, it is an advantage of the present invention that two cards can be disposed in the space for one card so that the space for arranging the cards can be reduced to a half of that required in the prior art structure.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter in detail with reference to the drawings.

Figure 1:
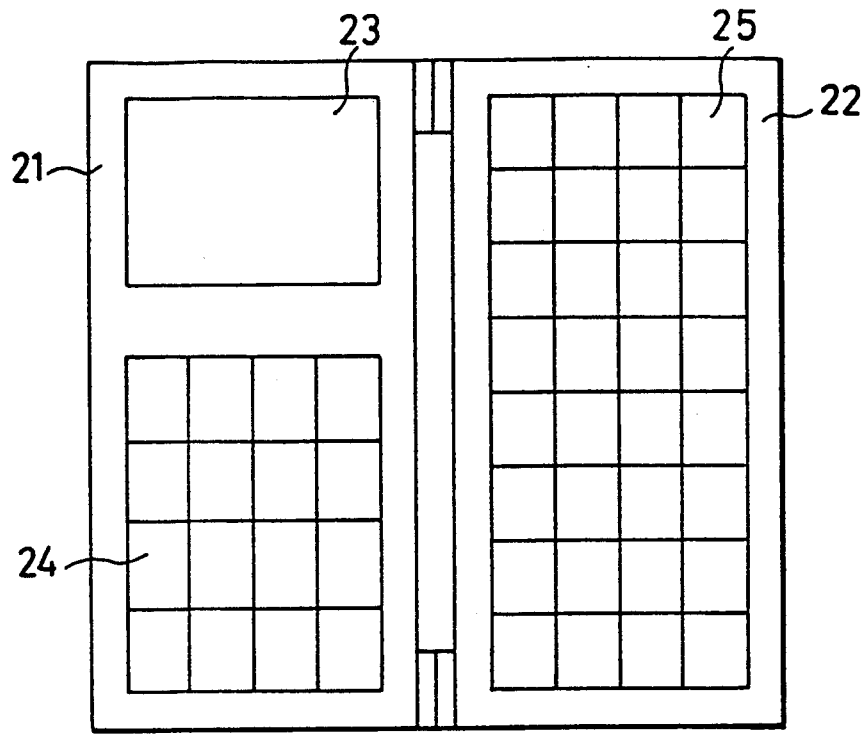
FIG. 1 is a plan view of an embodiment of the portable terminal device in accordance with the present invention.
Figure 2:
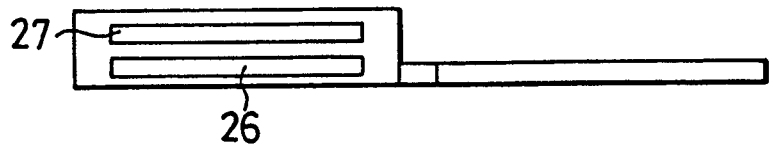
FIG. 2 is a vertical side view of the terminal device of FIG. 1.

FIGS. 1 and 2 are a plan view and a vertical side view of an embodiment of the portable terminal device in accordance with the present invention, respectively.

As illustrated in FIG. 1, the portable terminal device includes a left unit 21 and a right unit 22 combined together so that the device can be opened and closed in such manner as a note book.

In the upper portion of the left unit 21 is disposed a display unit 23 constituted from a liquid crystal display device. In the lower portion of the left unit 21 is disposed a transparent touch key portion including a plurality of keys 24. A primary circuit is arranged in the left unit 21. A key unit 25 including a plurality of keys are disposed on the right unit 22 covering almost entire surface thereof.

As illustrated in FIG. 2, a first inlet 26 for inserting an IC card of ISO (International Standardization Organization) standard type, for instance, is formed in the lower portion of the front side of the left unit 21. Also, a second inlet 27 for inserting a memory card is formed on the upper side of the first inlet 26. The two inlets 26 and 27 are disposed in parallel to each other. A memory card and an IC card can be simultaneously inserted to the terminal device through the first and second inlets 26 and 27, respectively, so that the two cards are installed in the left unit 21 of the device in a state that the memory card is superposing on the IC card.

Figure 3:
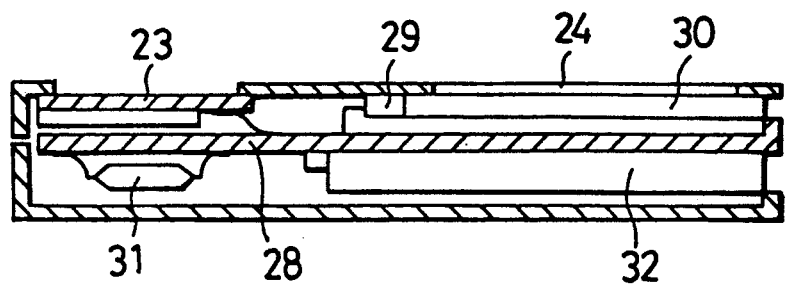
FIG. 3 is a sectional view of a left unit of the terminal device of FIG. 1.

FIG. 3 illustrates a sectional view of the left unit 21 of the portable terminal device of FIGS. 1 and 2.

As illustrated in FIG. 3, a printed wiring board 28 is installed in the housing of the unit. Electronic parts (not shown) are mounted on the printed wiring board 28. The display unit 23 is arranged on the upper side of the printed wiring board 28 and connected to the circuit of the wiring board 28 for driving the display. Also, a connector 29 for connecting the memory card is arranged on the upper side of the printed wiring board 28 and connected to the circuit of the wiring board. A memory card 30 is being inserted and connected to the connector 29. The memory card 30 is detachably disposed below the transparent touch key portion 24 so that the user can observe whether the card is inserted or not through the transparent portion 24. Also, the user can read the title and other letters written on the card through the transparent portion 24.

It is to be noted that an ejection means for ejecting the memory card 30 is not illustrated for simplifying the drawing. It is also to be noted that the printed wiring board 28 may be constituted from a double surface printed wiring board which includes upper and lower wiring surfaces or a single surface printed wiring board which includes one wiring surface on the upper or lower surface thereof. The printed wiring board 28 may also be constituted from a multi-layered printed wiring board.

A controller 31 and a mechanical unit 32 for an IC card are arranged in the lower side of the printed wiring board 28. The mechanical unit 32 includes a means for mechanically holding and ejecting the IC card and terminals which electrically connect to the terminals of the IC card module. An IC card is inserted into the mechanical unit 32 through the inlet which is formed in the right end side of the housing in the drawing. The IC card is constituted from the card which satisfies the ISO standard. However, the IC card may be constituted from the card of any other standard.

Figure 4:
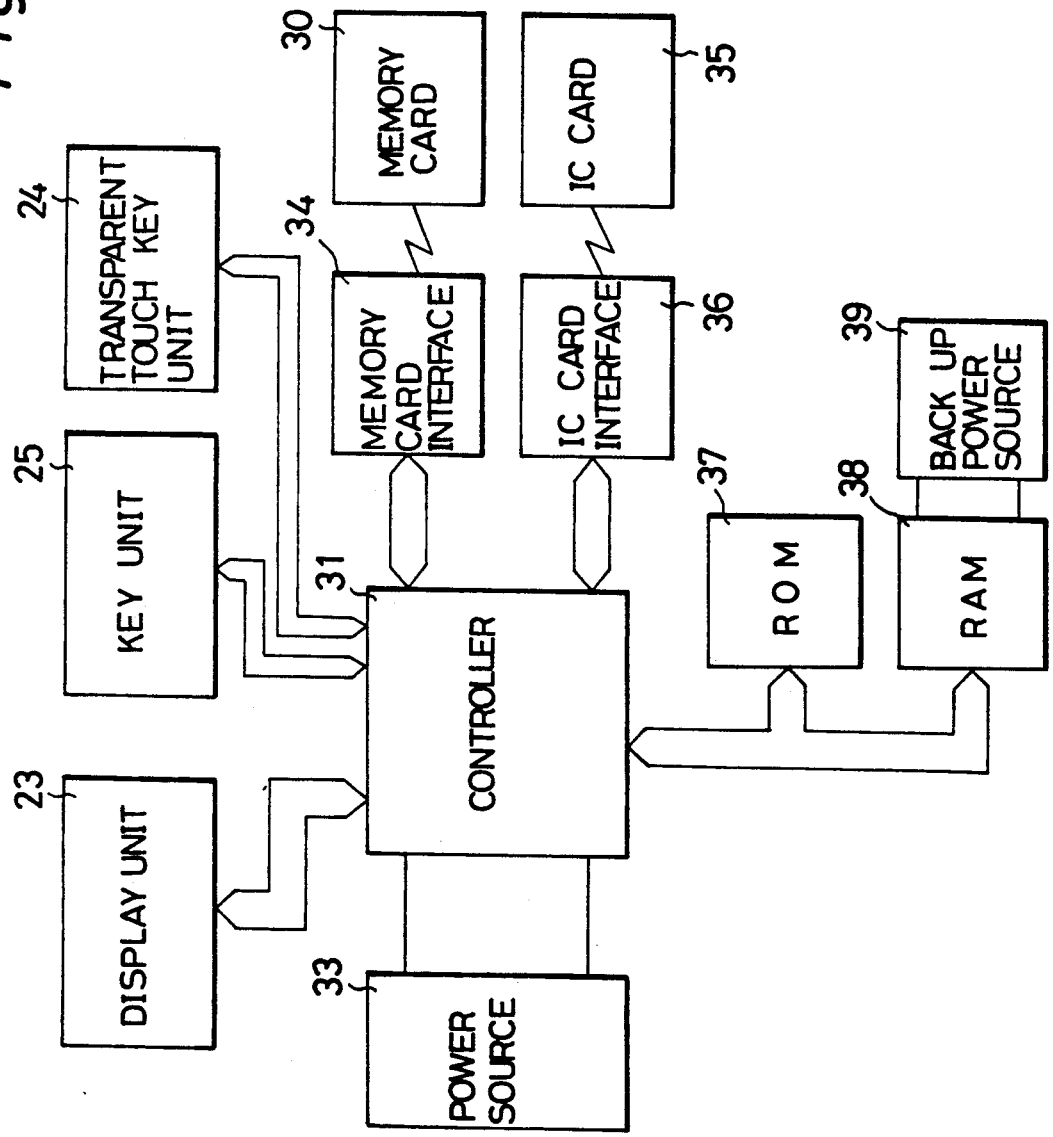
FIG. 4 is a block diagram of the electric system of the terminal device of FIG. 1.

FIG. 4 illustrates a block diagram representing the electrical connection of the portable terminal device of FIG. 1.

As illustrated in FIG. 4, the display unit 23, the transparent touch key unit 24, and the key unit 25 are connected to a controller 31. Also, a power unit 33 for supplying electric power to the controller 31 is connected to the controller. The controller 31 includes a microprocessor, for instance. To the controller 31 are connected an interface 34 for the memory card 30, an interface 36 for an IC card 35, a ROM (Read Only Memory) 37 for storing control programs for the controller 31, and a RAM (Random Access Memory) 38 for registering the operation area for the controller 31. A back up power unit 39 is connected to the RAM 38.

When an ISO standard type IC card is inserted into the portable terminal device through the inlet for the IC card, the controller 31 exchanges information data between the IC card 35 through the interface 36. Also, when the memory card 30 is inserted into the portable terminal device through the inlet for the memory card, the controller 31 exchanges information data between the memory card 30 through the interface 34.

In accordance with the above-mentioned structure of the portable terminal device of the present invention, the interface 36 for the ISO standard type IC card is disposed on one side of the printed wiring board whereas the interface 34 for the memory card is disposed on the other side of the printed wiring board, which makes it possible to install the two cards in the left unit of the device superposingly in parallel to each other. Therefore, it becomes possible to reduce the size of the device to one half of that of the structure wherein the two cards are disposed side by side on the same plane as is the case of the related art mentioned before.

As mentioned above in detail, in accordance with the present invention, the interface for the IC card is disposed on one side of the printed wiring board whereas the interface for the memory card is disposed on the other side of the printed wiring board so that the two cards can be inserted into the device in both sides of the printed wiring board in parallel to each other sandwiching the wiring board. Therefore, it becomes possible to realize a small and compact sized portable terminal device to which both of the IC card and the memory card can be connected simultaneously.

Many widely different embodiments of the present invention may be constructed without departing from the spirit and scope of the present invention. It should be understood that the present invention is not limited to the specific embodiments described in the specification, except as defined in the appended claims.

What is claimed is:

1. A portable terminal device comprising:
   a printed wiring board having two main sides;
   a first interface for a first information data exchanging card disposed on one side of said two main sides of said printed wiring board; and
   a second interface for a second information data exchanging card disposed on the other side of said two main sides of said printed wiring board;
   said first information data exchanging card being disposed in the vicinity of said one side of said two main sides and opposing to said one side of said two main sides,
   said second information data exchanging card being disposed in the vicinity of said other side of said two main sides and opposing to said other side of said two main sides,
   said first and second cards being disposed in parallel to each other to sandwich said two main sides.

2. A portable terminal device according to claim 1, wherein said portable terminal device is constituted from a left unit and a right unit being combined together to form a note book type structure which can be opened and closed and wherein said printed wiring board is disposed in one of said left unit and said right unit.

3. A portable terminal device according to claim 2, wherein a liquid crystal display portion and a transparent touch key portion are disposed on the unit in which said printed wiring board is installed so that one of said cards is visible through said transparent touch key portion.

4. A portable terminal device according to claim 1, wherein said first and second cards are an IC card and a memory card, respectively, and wherein said printed wiring board comprises a control circuit which is operated on the basis of information data of said cards.

* * * * *